US 009182852 B2

(12) United States Patent
Shinozaki

(10) Patent No.: US 9,182,852 B2
(45) Date of Patent: Nov. 10, 2015

(54) PROJECTION APPARATUS, METHOD, AND PROGRAM FOR A PROJECTOR PROJECTING PLURAL SCREEN SECTIONS ONE SCREEN SECTION AT A TIME

(75) Inventor: Yoshihiko Shinozaki, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 292 days.

(21) Appl. No.: 13/432,374

(22) Filed: Mar. 28, 2012

(65) Prior Publication Data

US 2012/0249421 A1    Oct. 4, 2012

(30) Foreign Application Priority Data

Mar. 31, 2011    (JP) .................... 2011-079615

(51) Int. Cl.
*G09G 5/00* (2006.01)
*G06F 3/042* (2006.01)
*H04N 9/31* (2006.01)

(52) U.S. Cl.
CPC ............ *G06F 3/0425* (2013.01); *H04N 9/3194* (2013.01)

(58) Field of Classification Search
CPC ................................................. G06F 3/0425
USPC .................... 345/156–178; 715/856–858
See application file for complete search history.

(56) References Cited

U.S. PATENT DOCUMENTS

| 7,240,111 B2 * | 7/2007 | VanHarlingen et al. ...... 709/224 |
| 8,106,884 B2 | 1/2012 | Nam et al. |
| 2003/0189675 A1 | 10/2003 | Itaki |

| 2004/0041786 A1 | 3/2004 | Inoue et al. |
| 2005/0162384 A1 | 7/2005 | Yokoyama |
| 2008/0244464 A1 * | 10/2008 | Slattery ................... 715/856 |
| 2010/0097312 A1 | 4/2010 | Destura et al. |

FOREIGN PATENT DOCUMENTS

| CN | 1679345 A | 10/2005 |
| EP | 2 074 867 A2 | 7/2009 |
| JP | 08-331667 A | 12/1996 |
| JP | 2003-091366 A | 3/2003 |
| JP | 2003-233460 A | 8/2003 |
| JP | 2007-257639 A | 10/2007 |

(Continued)

OTHER PUBLICATIONS

J.H. Young (Jul. 13, 2011, J.H.Young, p. 2, http://web.archive.org/web/20110713004644/http://graphics.comsci.us/notes/coord.html).*

Japanese Office Action dated Apr. 16, 2013 (and English translation thereof) in counterpart Japanese Application No. 2011-079615.

(Continued)

*Primary Examiner* — Jimmy H Nguyen
*Assistant Examiner* — Hang Lin
(74) *Attorney, Agent, or Firm* — Holtz, Holtz, Goodman & Chick PC

(57) ABSTRACT

A projection apparatus is configured to cooperate with a pointing device. An image input unit inputs an image signal from an external device. A projection unit projects, on a screen, an image on which coordinate information has been superimposed, according to the image signal input to the image input unit. A coordinate acquisition unit acquires, from the pointing device, a part of the coordinate information superimposed on the image projected by the projection unit. A correction unit corrects the coordinate information acquired by the coordinate acquisition unit. A transmission unit transmits the coordinate information corrected by the correction unit to the external device.

6 Claims, 5 Drawing Sheets

(56) References Cited

FOREIGN PATENT DOCUMENTS

| | | |
|---|---|---|
| JP | 2008-003802 A | 1/2008 |
| JP | 2008-152378 A | 7/2008 |
| JP | 2010-061433 A | 3/2010 |
| JP | 2010-086101 A | 4/2010 |

OTHER PUBLICATIONS

DLP Interactive Projectors: Texas Instruments Incorporated; 2009; (3 sheets).

Chinese Office Action dated Feb. 27, 2014 (and English translation thereof) in counterpart Chinese Application No. 201210139223.7.

\* cited by examiner

PROJECTION APPARATUS, METHOD, AND PROGRAM FOR A PROJECTOR PROJECTING PLURAL SCREEN SECTIONS ONE SCREEN SECTION AT A TIME

CROSS-REFERENCE TO RELATED APPLICATIONS

This application is based upon and claims the benefit of priority from prior Japanese Patent Application No. 2011-079615, filed Mar. 31, 2011, the entire contents of which are incorporated herein by reference.

BACKGROUND OF THE INVENTION

1. Field of the Invention

The present invention relates to a projection apparatus, a projection method, and a storage medium having program stored thereon, suitable for a projector using a pointing device.

2. Description of the Related Art

The technique for enabling a virtual image to be drawn on a projection image or a projection image to be pointed at with a pointing device (or a special pointing pen) in a DLP (Digital Light Processing) (a registered trademark) projector has been put to practical use.

This type of pointing pen reads invisible coordinate information modulated and superimposed on a projection image and transmits its position information to a projector body wirelessly.

Having received the position information, the projector transmits the information to an external device that is supplying an image signal, for example, a personal computer (hereinafter, referred to as a PC), thereby performing necessary writing on an image output to be projected on an application of the PC.

In a case where processing is performed with a plurality at screens being opened in multitasking on the PC that supplies images in a projection environment using the pointing pen, when images are being projected by, for example, the PC transmitting an image signal of a secondary screen to the projector, the PC, having received position information on the pointing pen via the projector, might create, on a primary screen, not on the secondary screen, an image in which the position information on the pointing pen has been reflected.

FIG. 5 shows the aforementioned projection system.

In FIG. 5, numeral 1 indicates a projector and numeral 2 indicates a PC that supplies to the projector 1 an image to be projected.

The projector 1 and PC 2 are connected to each other with a VGA cable VC and a USB cable UC.

The PC 2 supplies an image signal to the projector 1 via the VGA cable VC. The projector 1 projects, on a screen, a projection image PI according to the image signal.

Numeral 3 indicates a dedicated pointing pen for the projector 1. The projector 1 and pointing pen 3 are connected wirelessly by, for example, Bluetooth (a registered trademark) technology.

A projection image PI projected by the projector 1 is formed such that position coordinate information a invisible to the naked eye has been superimposed on an original image.

The pointing pen 3 includes a light-receiving system and a demodulating circuit for the position coordinate signal, thereby pointing at an arbitrary position in the projection image PI, demodulating the position coordinate signal in the pointed-at position, and transmitting the demodulated signal as pointed-at coordinate information to the projector 1.

Having received the information, the projector 1 transmits the coordinate information to the PC 2.

FIG. 6 shows a primary screen and a secondary screen on an application run on the PC 2, respectively.

When the PC 2 has been supplying an image signal of the secondary screen to the projector 1 via the VGA cable VC, the PC 2, having received the pointed-at coordinate information from the projector 1 via the USB cable UC, superimposes an image of a pointer PT corresponding to the pointing on the primary screen, not on the secondary screen, as shown in FIG. 6.

Therefore, the image of the pointer PT has not been reflected in the image signal of the secondary screen transmitted by the PC 2 to the projector 1, with the result that the pointer PT is not projected on the projection image PI.

BRIEF SUMMARY OF THE INVENTION

Accordingly, it is an object of the present invention to provide a projection apparatus, a projection method, and a storage medium having program stored thereon, capable of supplying a correct image signal in which the position of the pointer has been reflected to a device that is externally connected and supplies an image signal.

According to one aspect of the present invention, there is provided a projection apparatus configured to cooperate with a pointing device, comprising: an image input unit configured to input an image signal from an external device; a projection unit configured to project, on a screen, an image on which coordinate information has been superimposed, according to the image signal input to the image input unit; a coordinate acquisition unit configured to acquire, from the pointing device, a part of the coordinate information superimposed on the image projected by the projection unit; a correction unit configured to correct the coordinate information acquired by the coordinate acquisition unit; and a transmission unit configured to transmit the coordinate information corrected by the correction unit to the external device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF TEE INVENTION

Embodiments of the present invention will be described below with reference to the drawings.

First Embodiment

Hereinafter, an embodiment of DLP (a registered trademark) data projector apparatus to which the invention has been applied will be explained with reference to the accompanying drawings.

Figure 1:
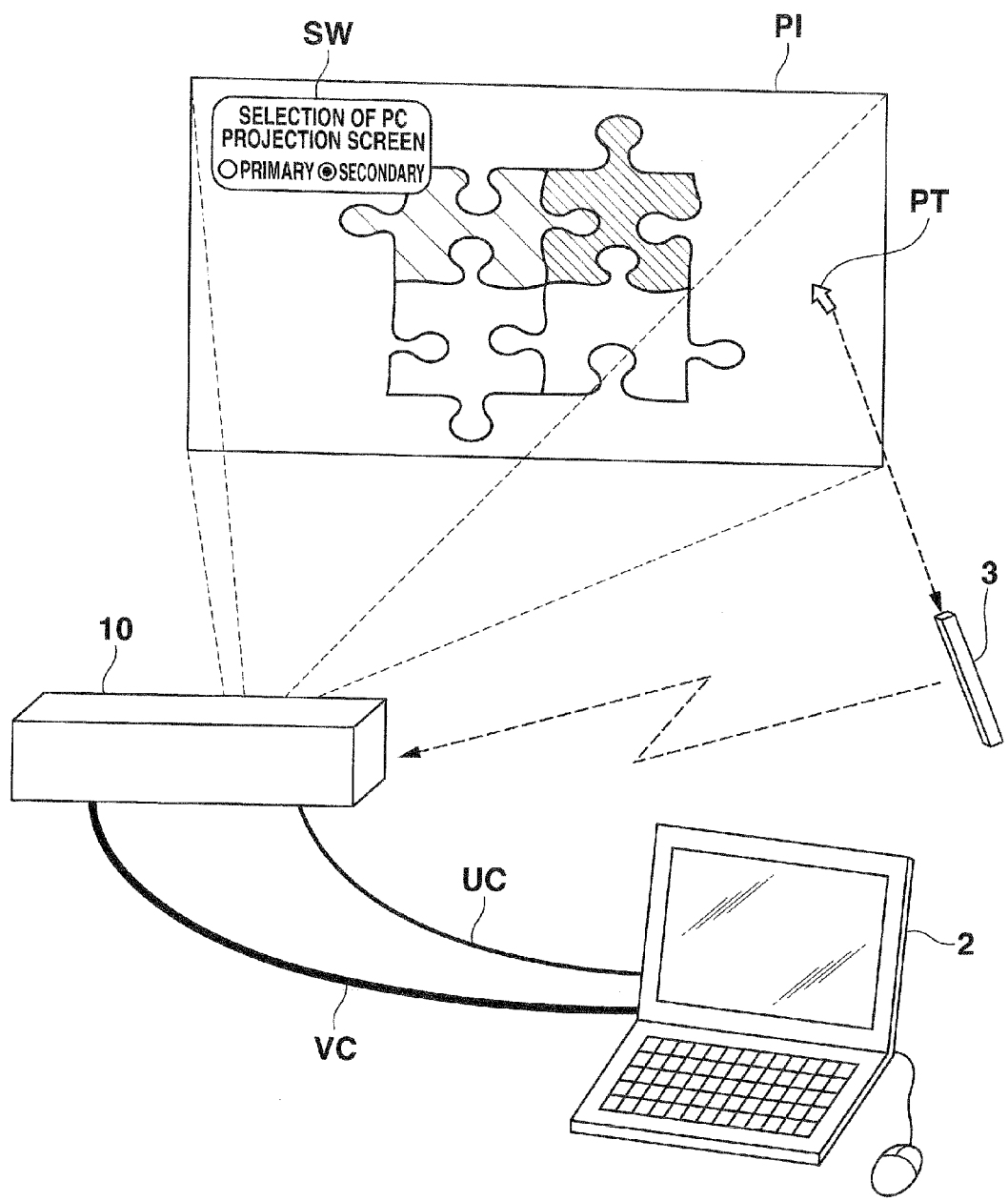
FIG. 1 shows a projection system that includes a projector with a pointing pen and a PC according to an embodiment.

FIG. 1 shows a projection system that includes the data projector apparatus 10 according to the embodiment.

Figure 5:
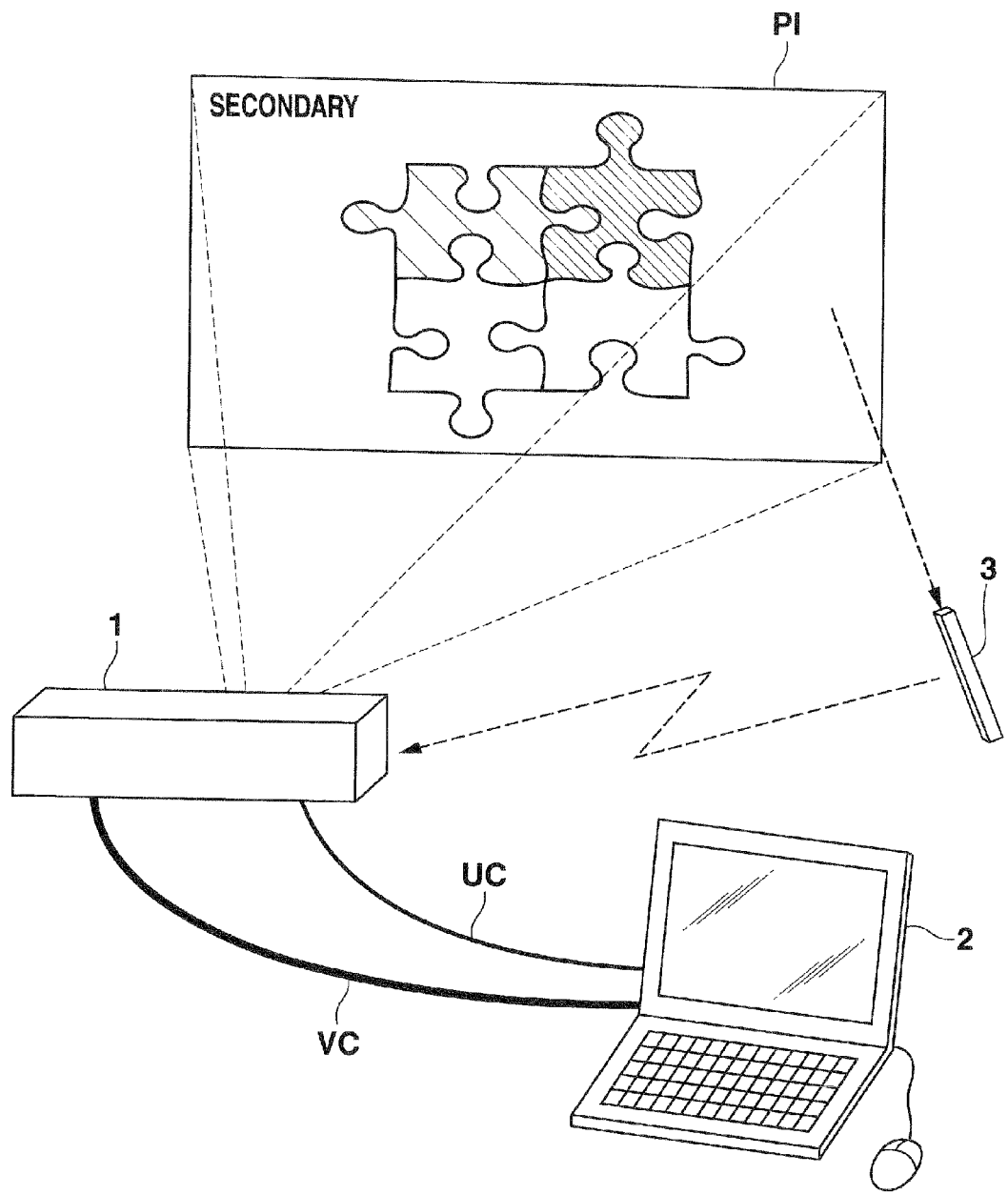
FIG. 5 shows a projection system that includes a projector with a pointing pen and a PC according to the prior art.
Figure 6:
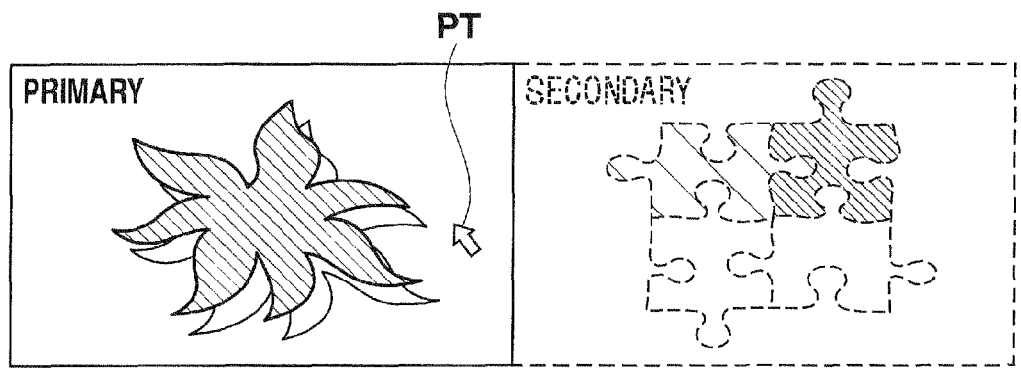
FIG. 6 shows a primary screen and a secondary screen on the PC of FIG. 5.

Since the projection system of FIG. 1 is the same as that of FIG. 5, except for the data projector apparatus 10, the same parts are indicated by the same reference numerals and an explanation of them will be omitted.

Figure 2:
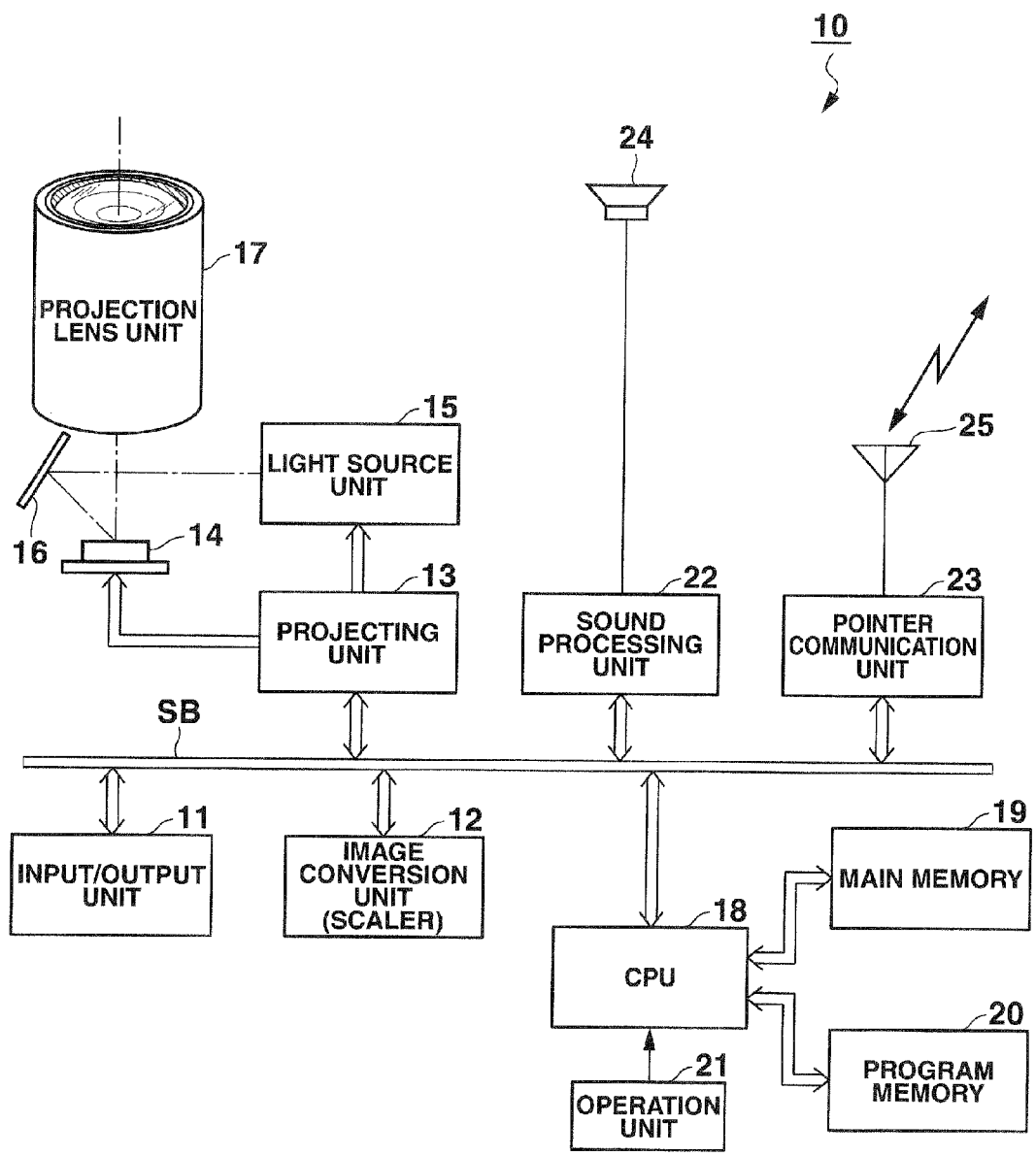
FIG. 2 is a block diagram schematically showing a functional configuration of a data projector apparatus according to the embodiment.

FIG. 2 schematically shows a functional configuration of the data projector apparatus 10.

An input/output unit 11 is configured by, for example, video input terminals, RGB input terminals, VGA terminals, and USB terminals for connecting with a PC.

An image signal input to the input/output unit 11 is digitized as needed and sent to an image conversion unit 12 via a system bus SB.

The image conversion unit 12, which is also referred to as a scaler, standardizes input image data into image data in a specific format suitable for projection and sends the resulting data to a projecting unit 13.

At this time, the image conversion unit 12 superimposes such data as symbols representing various operating states for On-Screen Display (OSD) on the image data as needed and sends the resulting image data to the projecting unit 13.

The projecting unit 13 drives a micromirror element 14, a spatial light modulation device, for displaying, according to the received image data by faster time-division driving achieved by multiplying a frame rate according to a specific format, such as 60 frames/second, the number of divisions of color components, and the number of display gradations together.

The micromirror element 14 turns on and off, at a high speed, the inclination angle of each of a plurality of micromirrors, such as a WXGA (Wide eXtended Graphic Array) (1280 pixels in width×800 pixels in height), arranged in an array to display an image, thereby forming an optical image by its reflected light.

At this time, an image displayed by the micromirror element 14 is formed such that position coordinate information invisible to the naked eye has been superimposed on an original image.

On the other hand, the light source unit 15 emits a plurality of color light beams, including R, G, B primary color light beams, in time division cyclically.

The light beams from the light source unit 15 are totally reflected by a mirror 16 and are shed on the micromirror element 14.

Then, an optical image is formed according to the colors of the source light by the reflected light from the micromirror element 14. The formed optical image passes through a projection lens unit 17 and is projected and displayed on a screen (not shown) serving as a projection object.

A CPU 18 controls all the operations of the above individual circuits.

The CPU 18 is connected directly to a main memory 19 and a program memory 20.

The main memory 19, which is configured by, for example, an SRAM, functions as a working memory of the CPU 18.

The program memory 20, which is configured by an electrically rewritable nonvolatile memory, stores operation programs executed by the CPU 18, various types of data, and others.

The CPU 18 performs control operations in the data projector apparatus 10, using the main memory 19 and program memory 20.

The CPU 18 performs various projection operations according to a key operation signal from an operation unit 21.

The operation unit 21 includes a key operation unit provided on the body of the data projector apparatus 10 and an infrared-ray receiving unit that receives infrared rays from a dedicated remote controller (not shown) for the data projector apparatus 10. The operation unit 21 directly outputs, to the CPU 15, a key operation signal based on a key operated by the user on the key operation unit of the body or on the remote controller.

In addition, the CPU 18 is also connected to a sound processing unit 22 and a pointer communication unit 23 via the system bus SB.

The sound processing unit 22, which includes a soundsource circuit, such as a PCM sound source, converts audio data supplied in a projecting operation into analog data, drives a speaker unit 24 to produce an amplified sound or a beep sound or the like as needed.

The pointer communication unit 23, which connects with the pointing pen 3 wirelessly via an antenna 25, receives coordinate information sent from the pointing pen 3 and operation signals of various keys provided on the pointing pen 3 and sends them to the CPU 18.

Next, an operation of the embodiment will be explained.

Figure 4:
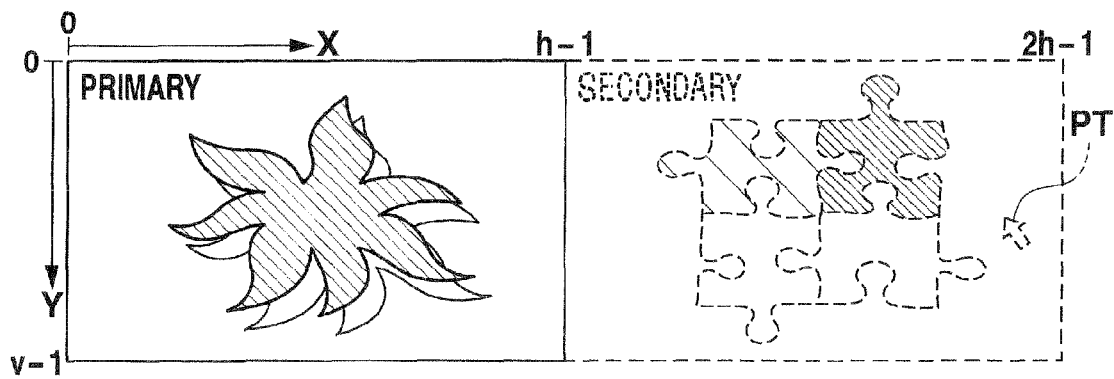
FIG. 4 shows a primary screen and a secondary screen output by the PC according to the embodiment.

In the PC 2 that supplies an image signal to the data projector apparatus 10 via the VGA cable VC, an image signal to be output is managed as shown in FIG. 4.

FIG. 4 shows the concept of an image signal managed and output by the PC 2.

In FIG. 4, the PC 2 recognizes and manages a primary image and a secondary image on the same X-Y coordinate system. As for Y coordinate values, they are in a coordinate range of "0" to "v−1 (v: 480 in VGA)" on the common coordinate system.

As for X coordinate value, for example, a primary image is in a coordinate range of "0" to "h−1 (h: 640 in VGA)" and a secondary image is in a coordinate range of "h" to "2h−1."

The PC 2 selects a primary image or a secondary image from the images managed on the coordinate system and outputs the selected image in the form of an image signal to the data projector apparatus 10.

An operation in the data projector apparatus 10 to which such an image signal is input will be explained.

An operation described below will be performed under the control of the CPU 18 in the data projector apparatus 10 in a projecting operation.

The CPU 18 reads an operation program and data stored in the program memory 20, develops and stores them in the main memory 19, and then executes the operation program.

Operation programs and the like stored in the program memory 20 include not only operation programs stored in the program memory 20 at the time of factory shipment of the data projector apparatus 10 but also new operation programs and the like externally installed by connecting the data projector apparatus 10 with the PC 2, for example, when the data projector apparatus 10 is upgraded in version.

Figure 3:
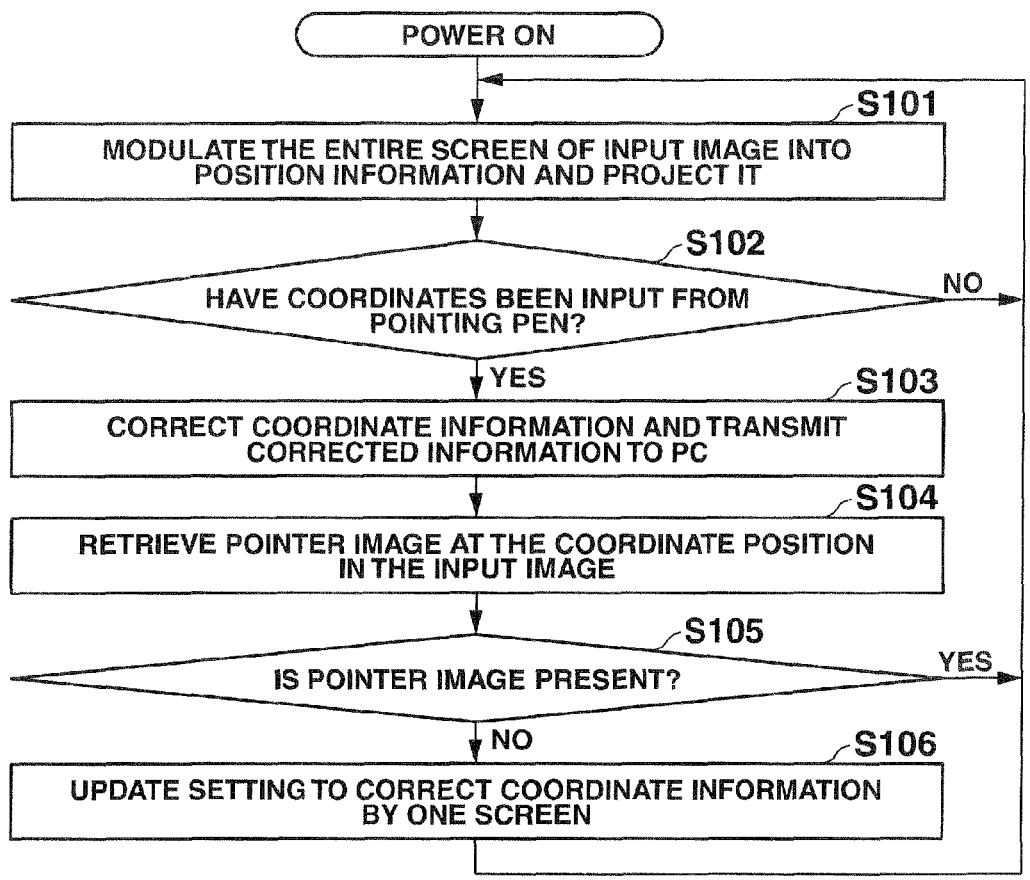
FIG. 3 is a flowchart to explain the process of operating the pointing pen in a projecting operation according to the embodiment.

FIG. 3 is a flowchart to explain the process of operating the pointing pen 3 in a projecting operation.

At the beginning of the operation, the CPU 18 superimposes invisible position coordinate information on an image signal input to the input/output unit 11 so as to cover the entire screen, displays the resulting signal on the micromirror element 14, and causes the projection lens unit 17 to project an optical image formed by the reflected light from the light, source unit 15 (step S101).

At the same time the projection lens unit 17 projects the optical image, the CPU 18 determines whether a projection image has been pointed at with the pointing pen 3, depending on whether the pointer communication unit 23 has input the coordinates of the pointing pen 3 via the antenna 25 (step S102).

When having determined that there is no input from the pointing pen 3, the CPU 18 returns to the process in step S101 and afterward to continue a projecting operation according to an image signal input by the input/output, unit 11.

When having determined in step S102 that there has been an input from the pointing pen 3, the CPU 18 corrects the input coordinate data suitably according to correction information set at that time and causes the input/output unit 11 to transmit the corrected coordinate data as point coordinate data from the pointing pen 3 to the PC 2 via the USB cable UC (step S103).

In parallel with the transmission of the point coordinate data to the PC 2, the CPU 18 displays the coordinate data on the micromirror element 14 at that time. Of the images projected by the projection lens unit 17, the CPU 18 retrieves an image pattern of, for example, a preset arrow-shaped pointer by image processing with the image conversion unit 12 from the surroundings including a position pointed at by the pointing pen 3 (step S104) and determines from the retrieval result whether the image of the pointer has been superimposed (step S105).

When having determined that the image of the pointer is present, the CPU 18 assumes that the position coordinates input from the pointing pen 3 have been recognized correctly by the PC 2 and reflected in an output image and therefore returns directly to the process in step S101 and afterward.

When having determined in step S105 that the image of the pointer was not be able to be retrieved, the CPU 18 assumes that the position coordinates input from the pointing pen 3 have not been recognized correctly by the PC 2 and therefore have not been reflected in the output image. Then, the CPU 18 updates the setting so that the correction amount of position coordinate data on the pointing pen 3 to be transmitted from the input/output unit 11 to the PC 2 via the USE cable PC may be corrected by one screen (step S106) and returns to the process in step s101 and afterward.

In this case, specifically, the value, of the x-coordinate in the position coordinate data to be transmitted to the PC 2 is incremented by +h for one screen.

When the maximum value of the x-coordinate of an image signal managed by the PC 2 is "2h−1," that is, when the PC 2 can manage only two screens, a primary screen and a secondary screen, at a maximum, if the total correction amount becomes "2h" as a result of the "+h" update setting, the CPU 18 resets the correction amount again to "0."

Therefore, although the PC 2 is outputting an image signal of a secondary image to the data projector apparatus 10, even when the PC 2 has superimposed the image of the pointer PT on the primary image, reflecting the position coordinate data on a point pointed at by the pointing pen 3, the data projector apparatus 10 automatically corrects one screen of position coordinate data on the pointing pen 3 and transmits the corrected data to the PC 2.

Therefore, the PC 2 superimposes the image of the pointer PT on the secondary image on the basis of the position coordinate data and outputs the resulting secondary image to the data projector apparatus 10. As a result, a secondary image in which the image of the pointer PT according to a pointing operation of the pointing pen 3 has been reflected is projected.

FIG. 4 shows a secondary image on which the image of the pointer PT has been superimposed by the processing performed on the PC 2 in addition to a primary image.

As described above in detail, with the first embodiment, the PC 2 that is externally connected and supplies an image signal can be caused to supply a correct image signal in which the position of the pointer has been reflected without a correction process on an application in the PC 2.

In the first embodiment, since the data projector apparatus 10 automatically recognizes whether the image of the pointer PT is included in images supplied from the PC 2 and makes correction if necessary, the user of the data projector apparatus 10 need not grasp a primary image, a secondary image, and the like on the data projector apparatus 10, enabling the user to use the data projector apparatus 10 naturally without effort.

Second Embodiment

Instead of automatic processing as in the first embodiment, the user may grasp the operations of the data projector apparatus 10 and PC 2 and perform a correction process manually.

In this case, for example, the user operates a specific key on the pointing pen 3 to cause a selection window SW on a PC projection screen as shown in a projection image PI of FIG. 1 to be projected. Then, the user points at either "Primary" or "Secondary" with the pointing pen 3 and performs a specific clicking operation, thereby causing the data projector apparatus 10 to grasp the pointing position.

Then, the data projector apparatus 10 sets the x-coordinate in the position coordinate data on the pointing pen 3 to be transmitted to the PC 2 at a value corresponding to either a primary image (in the range of "0" to "h−1" in FIG. 4) or a secondary image (in the range of "h" to "2h−1" in FIG. 4).

As described above, the user manually sets position coordinate data in the PC 2 by a pointing operation with the pointing pen 3. This enables the user to correct the operation position of the pointing pen 3 reliably and reflect the correction in the projection image when the user has grasped the operations of the data projector apparatus 10 and PC 2.

While in the second embodiment, the PC 2 has managed two screens, a primary screen and a secondary screen, and output one of them, it may manage three or more screens.

In such a case, too, a correction is made screen by screen as described in the second embodiment as many times as the number of necessary screens. For example, when the frame rate is 60 [frames/second], a proper correction amount can be updated and set in about 0.1 [second] or less without any problem in terms of physical sensations.

While the second embodiment has enabled a correct image signal reflecting the position of the pointer to be supplied without the help of an application on the PC 2, the operating position of the pointing pen 3 may be corrected reliably with the help of an application on the PC 2 and be reflected in a projection image.

(Modification 1)

While in the second embodiment, the correction has been realized only by the communication from the data projector apparatus 10 to the PC 2 via the USB cable UC, an application program on the PC 2 may notify the data projector apparatus 10 of a screen ID that shows which one of a plurality of screens has been selected and output via the USB cable UC. Then, the data projector apparatus 10 may make a correction according to the notified screen ID.

Specifically, for example, when the data projector apparatus 10 has been informed that the PC 2 is outputting a primary image (ID=1), the apparatus 10 uses the coordinate data directly as correction data. When the data projector apparatus 10 has been informed that the PC 2 is outputting a secondary image (ID=2), the apparatus 10 makes a correction so as to increment the value of the x-coordinate in the coordinate information by one screen "+h."

As described above, when the data projector apparatus 10 is informed of which image the PC 2 is outputting, the apparatus 10 can correct the operating position of the pointing pen 3 reliably and reflect the corrected operating position in a projection image.

(Modification 2)

In addition, a correction process performed by an application program on the PC 2 may be configured to provide a correct image signal reflecting the position of the pointer.

In that case, the application program on the PC 2 corrects coordinate information acquired via the USB cable UC according to the screen ID of a selected one of a plurality of screens.

Specifically, for example, when the PC 2 is outputting a primary image (ID=1), the data projector apparatus 10 uses the coordinate data directly as correction data. When the PC 2 is outputting a secondary image (ID=2), the PC 2 makes a correction so as to increment the value of the x-coordinate in the coordinate information by one screen "+h."

Then, an image pattern of the pointer showing the pointing position of a dedicated pointing device is superimposed on a corresponding position of the corrected coordinate information, and an image signal including the information on which the image pattern of the pointer has been superimposed is then output via the VGA cable VC.

As described above, even by a correction process performed by the application program on the PC 2, the operating position of the pointing pen 3 can be corrected reliably and reflected in the projection image.

The present invention is not limited to the above embodiments and, on the basis of available skills in the present or future implementation phase, may be modified variously without departing from the spirit or essential character thereof.

The functions implemented in the embodiments may be combined suitably as much as possible.

The embodiments include inventions of different stages and therefore various inventions can be extracted by combining suitably a plurality of a structural requirements disclosed in the embodiments.

For example, even if some are removed from all of the structural requirements shown in the embodiments, the resulting configuration can be extracted as an invention, provided that the effect of the invention is obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A projection apparatus which cooperates with a pointing device, the projection apparatus comprising:
    an image input unit which inputs an image signal from an external device which is configured to output a plurality of screen sections;
    a projection unit which projects, on a screen, an image on which coordinate information common to the plurality of screen sections has been superimposed, according to the image signal input to the image input unit, wherein the plurality of screen sections are not simultaneously displayed;
    a coordinate acquisition unit which acquires, from the pointing device, a coordinate position based on the coordinate information superimposed on the image projected by the projection unit;
    an image processing unit which determines whether or not, in the image projected by the projection unit, image data of a projected image region corresponding to the coordinate position acquired by the coordinate acquisition unit includes predetermined image data;
    a correction unit which, when the image processing unit determines that the image data of the projected image region corresponding to the acquired coordinate position does not include the predetermined image data, corrects the coordinate position acquired by the coordinate acquisition unit by an increment of a given value that is based on a screen ID indicating which one of the plurality of screen sections the external device is currently outputting; and
    a transmission unit which transmits the coordinate position corrected by the correction unit to the external device.

2. The projection apparatus according to claim 1, wherein the predetermined image data includes image data of an arrow-shaped pointer.

3. A projection method of projecting an image in cooperation with a pointing device, comprising:
    inputting an image signal from an external device which is configured to output a plurality of screen sections;
    projecting, on a screen, an image on which coordinate information common to the plurality of screen sections has been superimposed, according to the input image signal, wherein the plurality of screen sections are not simultaneously displayed;
    acquiring, from the pointing device, a coordinate position based on the coordinate information superimposed on the projected image;
    determining whether or not, in the projected image, image data of a projected image region corresponding to the acquired coordinate position includes predetermined image data;
    when it is determined that the image data of the projected image region corresponding to the acquired coordinate position does not include the predetermined image data, correcting the acquired coordinate position by an increment of a given value that is based on a screen ID indicating which one of the plurality of screen sections the external device is currently outputting; and
    transmitting the corrected coordinate position to the external device.

4. The projection method according to claim 3, wherein the predetermined image data includes image data of an arrow-shaped pointer.

5. A non-transitory computer-readable storage medium having a program stored thereon for controlling a computer of a projection apparatus which cooperates with a pointing device, the program being executable by the computer to control the projection apparatus to perform functions comprising:
- inputting an image signal from an external device which is configured to output a plurality of screen sections;
- projecting, on a screen, an image on which coordinate information common to the plurality of screen sections has been superimposed, according to the input image signal, wherein the plurality of screen sections are not simultaneously displayed;
- acquiring, from the pointing device, a coordinate position based on the coordinate information superimposed on the projected image;
- determining whether or not, in the projected image, image data of a projected image region corresponding to the acquired coordinate position includes predetermined image data;
- when it is determined that the image data of the projected image region corresponding to the acquired coordinate position does not include the predetermined image data, correcting the acquired coordinate position by an increment of a given value that is based on a screen ID indicating which one of the plurality of screen sections the external device is currently outputting; and
- transmitting the corrected coordinate position to the external device.

6. The non-transitory computer-readable storage medium according to claim 5, wherein the predetermined image data includes image data of an arrow-shaped pointer.

* * * * *